United States Patent
Kawamura et al.

(10) Patent No.: US 11,910,284 B2
(45) Date of Patent: Feb. 20, 2024

(54) ALERT SYSTEM FOR VEHICLE TO OUTPUT ALERT ABOUT OCCUPANT BEING LEFT IN VEHICLE

(71) Applicant: SUBARU CORPORATION, Tokyo (JP)

(72) Inventors: Kousei Kawamura, Tokyo (JP); Tomoya Kanagawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/744,978

(22) Filed: May 16, 2022

(65) Prior Publication Data

US 2022/0386095 A1 Dec. 1, 2022

(30) Foreign Application Priority Data

May 28, 2021 (JP) ................................ 2021-089847

(51) Int. Cl.
*H04W 4/48* (2018.01)
*H04W 4/90* (2018.01)
*B60R 25/31* (2013.01)
*B60R 25/24* (2013.01)
*H04W 4/02* (2018.01)

(52) U.S. Cl.
CPC ............ *H04W 4/48* (2018.02); *B60R 25/245* (2013.01); *B60R 25/31* (2013.01); *H04W 4/023* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 2017/0140627 A1 | 5/2017 | Qian et al. | |
| 2020/0296545 A1* | 9/2020 | Dingli | G08B 21/24 |
| 2021/0253063 A1* | 8/2021 | Pupillo | B60R 25/31 |

FOREIGN PATENT DOCUMENTS

JP 2017-139739 A 8/2017

* cited by examiner

*Primary Examiner* — Frantz Bataille
(74) *Attorney, Agent, or Firm* — Rimon P.C.; Tomoki Tanida

(57) ABSTRACT

An alert system outputs one or more alerts about an occupant being left in a vehicle. The alert system includes an in-vehicle object detector and an alert controller. The in-vehicle object detector detects objects in a vehicle compartment, including the occupant. If the occupant is left in the compartment after a driver has left the vehicle, the alert controller controls outputting of the one or more alerts to mobile terminals of persons including the driver. If the driver has left the vehicle, the alert controller causes the in-vehicle object detector to begin a detection processing for detecting the occupant being left in the compartment. If the occupant is left in the compartment, the alert controller determines whether the mobile terminal of the driver is left in the compartment. The alert controller switches outputting of the one or more alerts to among the mobile terminals of the persons in accordance with whether the mobile terminal of the driver is left in the compartment.

4 Claims, 10 Drawing Sheets

FIG. 5

| ALERT OUTPUT ORDER | MEDIUM | CONTENT | OBTAINED INFORMATION | TARGET EXAMPLES |
|---|---|---|---|---|
| FIRST DRIVER | APPLICATION COMMUNICATION | POSITION OF SUBJECT AUTOMOBILE AND DETAILED SITUATION (IMAGE) | POSITION OF TERMINAL | OWNER OF SUBJECT AUTOMOBILE |
| SECOND DRIVER | APPLICATION COMMUNICATION | POSITION OF SUBJECT AUTOMOBILE AND DETAILED SITUATION (IMAGE) | POSITION OF TERMINAL | FAMILY MEMBER (ADULT) OF FIRST DRIVER |
| OCCUPANT | EMAIL | POSITION OF SUBJECT AUTOMOBILE AND DETAILED SITUATION (IMAGE) | POSITION OF TERMINAL | FAMILY MEMBER OF FIRST DRIVER |
| ... | ... | ... | ... | ... |
| EMERGENCY CALL 1 | TELEPHONE NO. | POSITION OF SUBJECT AUTOMOBILE, BRIEF SITUATION, AND CONTACT DETAILS | | POLICE |
| EMERGENCY CALL 2 | SERVER COMMUNICATION | POSITION OF SUBJECT AUTOMOBILE AND DETAILED SITUATION (IMAGE AND BIOLOGICAL INFORMATION) | | FIRE STATION |

ALERT SYSTEM FOR VEHICLE TO OUTPUT ALERT ABOUT OCCUPANT BEING LEFT IN VEHICLE

CROSS-REFERENCE TO RELATED APPLICATIONS

The present application claims priority from Japanese Patent Application No. 2021-089847 filed on May 28, 2021, the entire contents of which are hereby incorporated by reference.

BACKGROUND

The disclosure relates to an alert system for a vehicle to output an alert about an occupant being left in the vehicle.

There may be a case in which, after a driver has left a vehicle, such as an automobile, an occupant, such as a child, is left in a compartment of the vehicle. If the driver is unaware of this situation and the occupant is being left for a long time in very hot weather, for example, the occupant may get into a difficult situation. In particular, if the driver leaves the vehicle while an infant is sleeping, the result of leaving the infant in the vehicle may affect the health of the infant.

Japanese Unexamined Patent Application Publication No. 2017-139739 discloses the following technology. A mobile terminal of a driver is linked with a vehicle. If a child is left in the compartment of the vehicle, an alert is repeatedly output to the mobile terminal of the driver a preset times under a predetermined condition. If there is no response from the mobile terminal after an alert is output the preset times, an emergency call is sent as an alert. As a result of outputting an alert in this manner, a child is less likely to be left in the compartment of an automobile for a long time.

SUMMARY

An aspect of the disclosure provides an alert system for a vehicle to output one or more alerts about an occupant being left in the vehicle. The alert system includes an in-vehicle object detector and an alert controller. The in-vehicle object detector is configured to detect objects in a compartment of the vehicle, including the occupant. In a case where the occupant is being left in the compartment after a driver of the vehicle has left the vehicle, the alert controller is configured to control outputting of the one or more alerts to mobile terminals of persons including a mobile terminal of the driver of the vehicle. In a case where the driver has left the vehicle, the alert controller is configured to cause the in-vehicle object detector to begin a detection processing for detecting the occupant being left in the compartment of the vehicle. In a case where the occupant is being left in the compartment after the driver has left the vehicle, the alert controller is configured to determine whether the mobile terminal of the driver is left in the compartment. The alert controller is configured to switch outputting of the one or more alerts to among the mobile terminals of the persons including the mobile terminal of the driver in accordance with whether the mobile terminal of the driver having left the vehicle is left in the compartment.

An aspect of the disclosure provides an alert system for a vehicle to output one or more alerts about an occupant being left in the vehicle. The alert system includes a sensor and circuitry. The sensor is configured to detect objects in a compartment of the vehicle, including the occupant. In a case where the occupant is being left in the compartment after a driver of the vehicle has left the vehicle, the circuitry is configured to control outputting of the one or more alerts to mobile terminals of a persons including a mobile terminal of the driver. In a case where the driver has left the vehicle, the circuitry is configured to cause the sensor to begin a detection processing for detecting the occupant being left in the compartment of the vehicle. In the case where the occupant is being left in the compartment after the driver has left the vehicle, the circuitry is configured to determine whether the mobile terminal of the driver is left in the compartment. The circuitry is configured to switch outputting of the one or more alerts to between the mobile terminals of the of persons including the mobile terminal of the driver in accordance with whether the mobile terminal of the driver having left the vehicle is left in the compartment.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 5 illustrates an example of an emergency contact list recorded on a memory of an in-vehicle object monitoring device illustrated in FIG. 3;

DETAILED DESCRIPTION

In the technology disclosed in JP-A No. 2017-139739, an alert is output in a fixed, uniform manner, as discussed above.

For example, if a driver has left his/her mobile terminal in the compartment of the vehicle, an alert output to this mobile terminal does not reach the driver.

It is thus desirable to output an alert about an occupant, such as a child, being left in a vehicle in a suitable manner in accordance with the situation.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
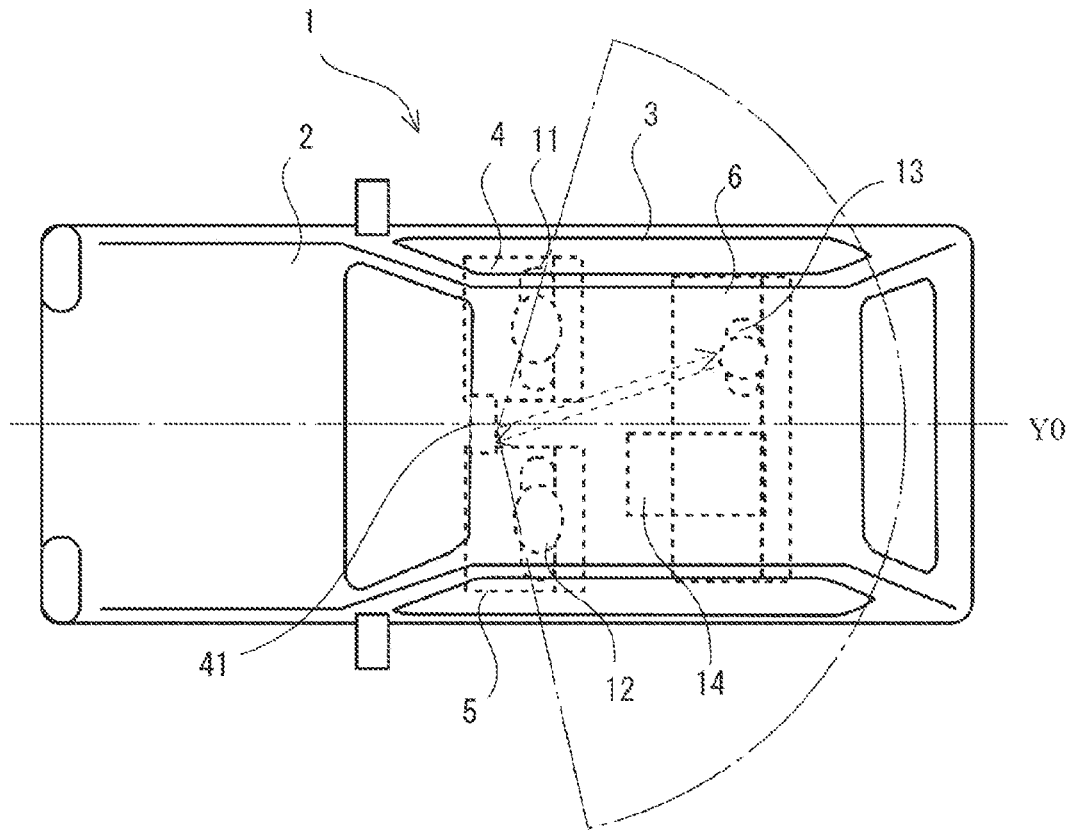
FIG. 1 is a schematic plan view of an automobile using an alert system according to an embodiment of the disclosure.

FIG. 1 is a schematic plan view of an automobile 1 using an alert system which outputs an alert about an occupant being left in a vehicle (hereinafter simply called the alert system) according to the embodiment.

Figure 2:
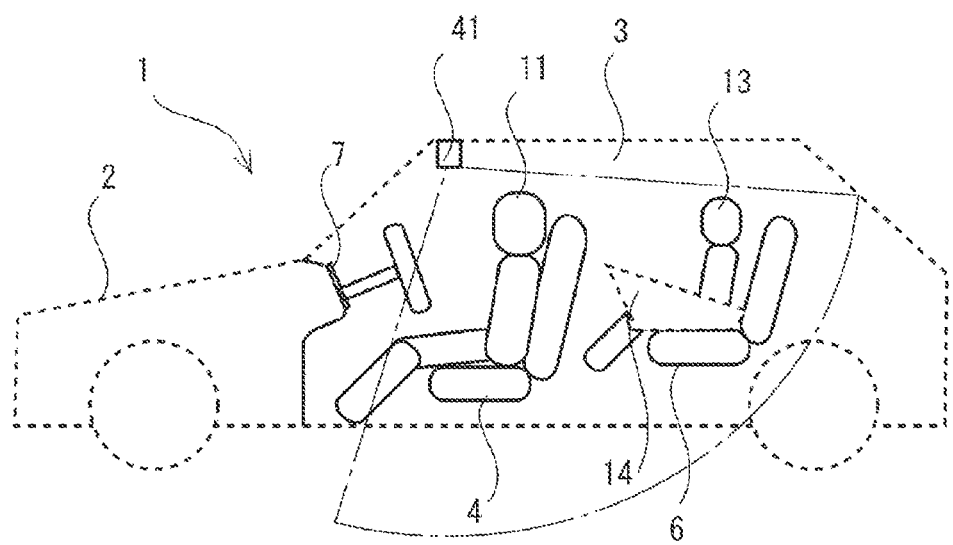
FIG. 2 is a schematic vertical sectional view of the automobile illustrated in FIG. 1.

FIG. 2 is a schematic vertical sectional view of the automobile 1 illustrated in FIG. 1 taken along line Y0, which indicates the center position in the widthwise direction of the automobile 1.

The automobile 1 is an example of a vehicle. Examples of a power source of the automobile 1 are an internal combustion engine that generates power by the combustion of a fuel such as gasoline or ethanol, an electric motor using stored electricity, a power source using hydrogen, and a combination of these power sources.

The automobile 1 illustrated in FIGS. 1 and 2 includes a body 2. The body 2 includes a compartment 3 which can accommodate multiple occupants. Inside the compartment 3, multiple seats 4 through 6 are disposed in the longitudinal (front-back) direction of the automobile 1. In one example, from the front side of the automobile 1, a front seat 4 where a driver 11 can sit, a front seat 5 where an occupant 12 can sit, and a back seat 6 where multiple occupants can sit side by side in the widthwise direction of the automobile 1 are disposed. Behind the back seat 6, a luggage compartment is provided. A dashboard 7 is provided in front of the front seats 4 and 5.

When the driver 11 gets in the automobile 1, he/she opens the front right door (not illustrated), enters the compartment 3, sits in the front seat 4 for the driver 11, and then closes the door. When the driver 11 gets out of the automobile 1, he/she opens the front right door, leaves the compartment 3, and closes the door.

When the occupant 12 gets in the automobile 1, he/she opens the front left door (not illustrated), for example, enters the compartment 3, sits in the front seat 5 for the occupant 12, and then closes the door. When the occupant 12 gets out of the automobile 1, he/she opens the front left door, leaves the compartment 3, and closes the door.

When a child 13 gets in the automobile 1, he/she opens the rear right door or the rear left door (not illustrated), enters the compartment 3, sits in the back seat 6, and then closes the door. When the child 13 gets out of the automobile 1, he/she opens the rear right door or the rear left door, leaves the compartment 3, and closes the door. If the child 13 is an infant who needs help, an adult, such as the driver 11 or the occupant 12, opens the rear right door or the rear left door, fixes an infant car seat 14 on the back seat 6, and then places the infant on the infant car seat 14. The child 13 may sit in the front seat 5 for the occupant 12, and the occupant 12 may sit in the back seat 6.

Adults and the child 13 directly sitting in the seats 4 through 6 fasten seatbelts (not illustrated), so that they can sit by leaning their upper bodies against the backrests of the seats 4 through 6. Basically, the positions of the occupants sitting in the seats 4 through 6 are included within a certain range.

While the occupants including the driver 11 and the occupant 12 sit in the seats 4 through 6 in the compartment 3, the automobile 1 starts to run by the driving operation of the driver 11, driving support, or autonomous driving.

In the above-described automobile 1, it is desirable to monitor the occupants including the driver 11 in the compartment 3 during driving and also to monitor whether an occupant, such as the child 13, is being left in the compartment 3 after the driver 11 has left the automobile 1.

Figure 3:
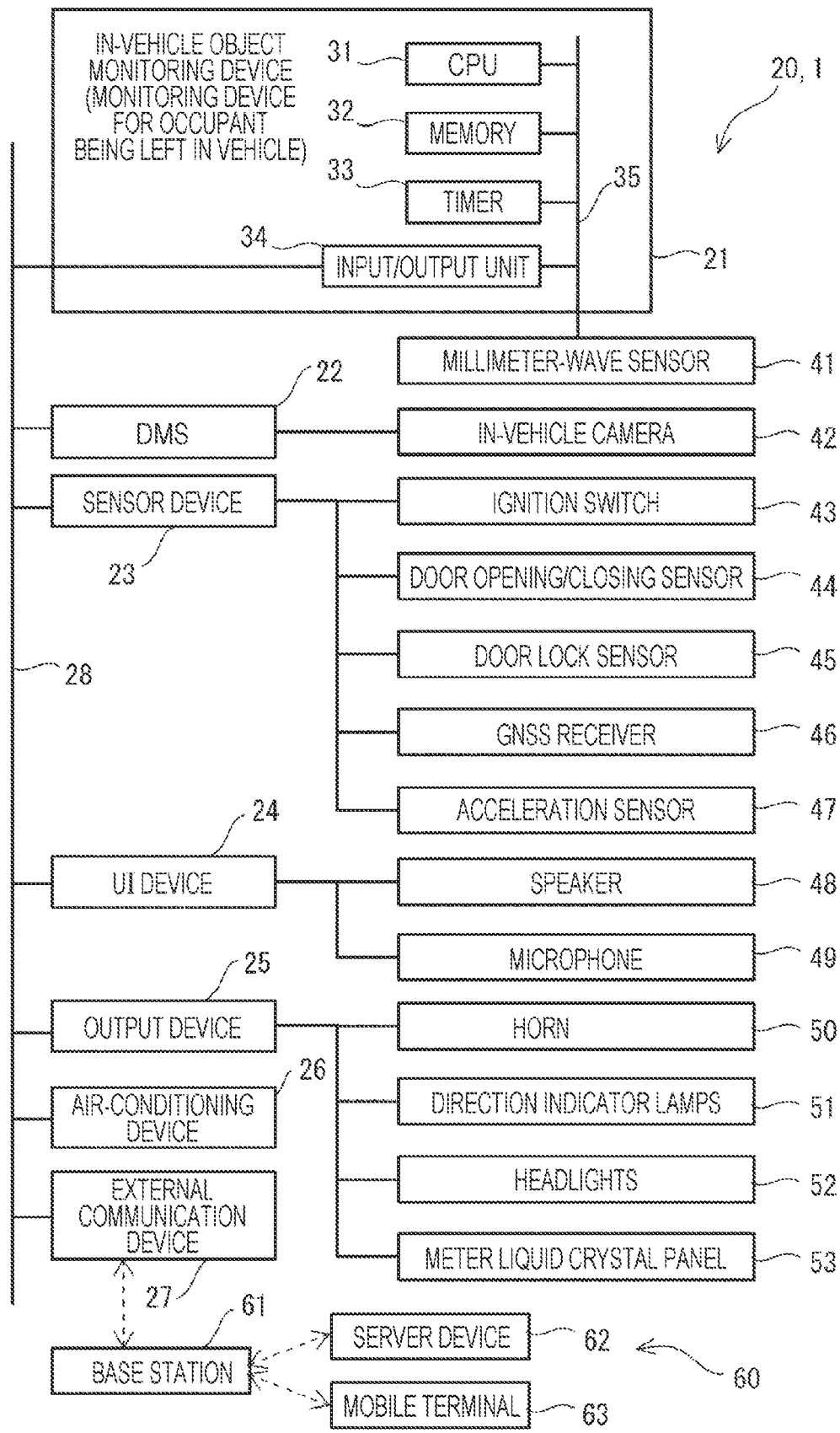
FIG. 3 is a block diagram of a control system, which serves as the alert system, in the automobile illustrated in FIG. 1.

FIG. 3 is a block diagram of a control system 20, which serves as the alert system, in the automobile 1 illustrated in FIG. 1.

The alert system for the automobile 1 is able to monitor whether an occupant, such as the child 13, is being left in the compartment 3 after the driver 11 has left the automobile 1 and to output an alert if an occupant is being left.

The control system 20 illustrated in FIG. 3 includes an in-vehicle object monitoring device 21, a driver monitoring system (DMS) 22, a sensor device 23, a user interface (UI) device 24, an output device 25, an air-conditioning device 26, an external communication device 27, and an in-vehicle network 28 to which these elements are coupled.

The in-vehicle network 28 may be a wired communication network for the automobile 1, such as the one based on a controller area network (CAN) or a local interconnect network (LIN). The in-vehicle network 28 may be a communication network, such as a local area network (LAN), or a combination of such a communication network and a wired communication network. The in-vehicle network 28 may partially include a wireless communication network. The in-vehicle object monitoring device 21, the DMS 22, the sensor device 23, the UI device 24, the output device 25, the air-conditioning device 26, and the external communication device 27 coupled to the in-vehicle network 28 can input and output data with each other by sending and receiving encrypted packets appended with the IDs of corresponding devices.

An in-vehicle camera 42 is coupled to the DMS 22. The in-vehicle camera 42 may be disposed on the dashboard 7 so as to image the compartment 3, mainly the driver 11, from the front side. Multiple in-vehicle cameras 42 may be coupled to the DMS 22. For example, one in-vehicle camera may be used for mainly imaging the driver 11, while the other in-vehicle camera may be used for imaging the entire compartment 3 at a wide angle. An infrared light-emitting diode (LED) may also be coupled to the DMS 22. The DMS 22 may identify occupants such as the driver 11 and monitor their states, based on the image captured by the in-vehicle camera 42. The DMS 22 may monitor the state of an occupant, such as whether the occupant is looking away from the traveling direction or is falling asleep, based on the state of the occupant and the direction of the face and/or the eyes of the occupant. As a result of applying infrared to an occupant, a vein pattern of the occupant can be imaged, so that the DMS 22 can generate information, such as the pulse rate. The DMS 22 may output an image of the compartment 3 captured by the in-vehicle camera 42 and information generated based on the image to another device via the in-vehicle network 28.

Various sensors disposed in the automobile 1, such as an ignition switch 43, a door opening/closing sensor 44, a door lock sensor 45, a global navigation satellite system (GNSS) receiver 46, and an acceleration sensor 47, are coupled to the sensor device 23. Some sensors, such as the GNSS receiver 46, may be directly coupled to the in-vehicle network 28.

The ignition switch 43 is a toggle switch to be operated by the driver 11 to start the automobile 1. When the driver 11 operates the ignition switch 43 one time, the power source of the automobile 1 enters the operating state or the operable state. When the power source of the automobile 1 is in the operating state or the operable state, the automobile 1 can run by using power generated from the power source. When the driver 11 operates the ignition switch 43 two times, the power source of the automobile 1 is stopped.

The door opening/closing sensor 44 detects that the doors (not illustrated) of the automobile 1 are opened or closed. The door opening/closing sensor 44 may be provided for each of the doors of the automobile 1. When an occupant gets in or out of the automobile 1, he/she opens a door and closes it. The door opening/closing sensor 44 detects that the occupant opens and closes the door.

The door lock sensor 45 detects the locking state of the doors (not illustrated) of the automobile 1. The door lock sensor 45 may be provided, together with a door locker, for each of the doors of the automobile 1. The door locker locks the door so that the door is not opened or closed. The door lock sensor 45 may detect the locking state and the unlocking state of the door locker.

The GNSS receiver 46 receives radio waves from GNSS satellites (not illustrated) to detect the position of the GNSS receiver 46 and generates information on the position of the automobile 1 by using the position of the GNSS receiver 46. The GNSS receiver 46 may generate precise time information as well as information on the position of the automobile 1, based on the radio waves received from the GNSS satellites.

The acceleration sensor 47 detects the acceleration acting on the automobile 1. The acceleration sensor 47 may detect three-axis acceleration, that is, the acceleration in the longitudinal direction, which is the front-back direction of the automobile 1, the acceleration in the vertical direction, which is the top-bottom direction of the automobile 1, and the acceleration in the lateral direction, which is the widthwise direction of the automobile 1. The acceleration sensor 47 may generate yaw acceleration, pitch acceleration, roll acceleration, yaw rate, pitch rate, and roll rate, based on the detected three-axis acceleration.

The sensor device 23 may obtain the values detected by the ignition switch 43, the door opening/closing sensor 44, the door lock sensor 45, the GNSS receiver 46, and the acceleration sensor 47 coupled to the sensor device 23 and output these values or information based on the values to another device via the in-vehicle network 28.

A speaker 48 and a microphone 49 are coupled to the UI device 24. A touchscreen display device and various switches may also be coupled to the UI device 24. The speaker 48 outputs sound to the compartment 3. The microphone 49 picks up sound in the compartment 3. The touchscreen display device displays a screen that an occupant can operate. The UI device 24 may output data on sound picked up by the microphone 49 to another device via the in-vehicle network 28.

A horn 50, direction indicator lamps 51, headlights 52, and a meter liquid crystal panel 53 of the automobile 1 are coupled to the output device 25. The horn 50, the direction indicator lamps 51, and the headlights 52 are provided on the outer surface of the body 2 of the automobile 1. An autonomous driving lamp, which is provided on the outer surface of the body 2 of the automobile 1, may also be coupled to the output device 25. The meter liquid crystal panel 53 is provided in front of the driver 11 on the dashboard 7 and displays driving information of the automobile 1 for the driver 11.

The air-conditioning device 26 performs air-conditioning in the compartment 3 of the automobile 1 so that the temperature of the compartment 3 is set to be a preset temperature, for example.

The external communication device 27 establishes a communication path with a base station 61, which is disposed outside the automobile 1, and sends and receives wireless data with a server device 62 and a mobile terminal 63 coupled to the base station 61. Examples of the wireless communication standards are International Mobile Telecommunications-2020 (IMT-2020) and Institute of Electrical and Electronics Engineers (IEEE) 802.11ax. The base station 61 may be a base station run by a carrier of the mobile terminal 63 or a base station for an intelligent transport system (ITS). The server device 62 may be a computer having a communication function used by public service sectors and private service sectors, such as automobile manufacturing companies, cellular phone carriers, service providers for automobiles, police, fire stations, and hospitals. For example, in response to an emergency call received from the external communication device 27 of the automobile 1 by the server device 62, a public service sector, for example, dispatches the staff to rescue an occupant. The mobile terminal 63 may be a mobile computer having a communication function used by the driver 11, the occupant 12, or other users.

An application program for allowing the server device 62 or the mobile terminal 63 to communicate with the alert system for the automobile 1 via the base station 61 is installed in the server device 62 or the mobile terminal 63.

The control system 20, which functions as the alert system, and the server device 62 or the mobile terminal 63 form a system 60 for reporting that an occupant is being left in the automobile 1.

The in-vehicle object monitoring device 21 includes a central processing unit (CPU) 31, a memory 32, a timer 33, an input/output unit 34, and an internal bus 35. The CPU 31, the memory 32, the timer 33, the input/output unit 34 are coupled to the internal bus 35. A millimeter-wave sensor 41 is also coupled to the internal bus 35.

As in the in-vehicle object monitoring device 21, each of the above-described DMS 22, sensor device 23, UI device 24, output device 25, air-conditioning device 26, and external communication device 27 may also include a CPU, a memory, a timer, an input/output unit, and an internal bus to which these elements are coupled.

Likewise, the server device 62 or the mobile terminal 63, which is a computer having a communication function, may also include a CPU, a memory, a timer, an external communication unit, and an internal bus to which these elements are coupled.

The input/output unit 34 is coupled to the in-vehicle network 28. The input/output unit 34 outputs an encrypted packet including data to be sent by the CPU 31 and appended with the ID of a receiver device to the in-vehicle network 28. The input/output unit 34 monitors the in-vehicle network 28 and obtains from the in-vehicle network 28 an encrypted packet appended with the ID of the in-vehicle object monitoring device 21 as a receiver device. The input/output unit 34 outputs data included in the obtained packet to the CPU 31.

The timer 33 measures various times including the clock time. The clock time of the timer 33 may be calibrated and set to the clock time generated by the GNSS receiver 46. The timer 33 may count the program execution interval, for example, and output an interrupt signal to the CPU 31 every time it counts the program execution interval.

The millimeter-wave sensor 41 is disposed on the top front portion of the compartment 3, as illustrated in FIG. 1, for example, on an overhead console. The millimeter-wave sensor 41 may include two transmit antennas for transmitting millimeter waves and four receive antennas for receiving millimeter waves, for example. In this case, the millimeter-wave sensor 41 has eight channels. The millimeter frequency band may be either one of the 24 GHz band, the 60 GHz band, and the 74 GHz band.

The millimeter-wave sensor 41 outputs millimeter waves to a predetermined range of the compartment 3 mainly from the top front to the rear bottom of the compartment 3. Millimeter waves output from the millimeter-wave sensor 41 transmit the backrests of the front seats 4 and 5, which are not made of a metal plate, and are reflected by the backrest of the back seat 6 using a metal plate. For example, the millimeter-wave sensor 41 scans the compartment 3 in the widthwise direction with millimeter waves and receives millimeter waves reflected by the substantially entirety of the compartment 3. The reflected millimeter waves received by the millimeter-wave sensor 41 also include those reflected by somewhere beneath the back seat 6, which is behind the front seats 4 and 5, and those reflected by the luggage compartment behind the back seat 6. Components included in the reflected millimeter waves are different in accordance with whether they represent a human body, belongings, or neither of a human body nor belongings. As more components are included in reflected waves, the detection level of the reflected waves becomes higher.

In this manner, the millimeter-wave sensor 41 outputs millimeter radio waves to the compartment 3 of the automobile 1 and detects millimeter waves reflected by objects, such as an occupant and belongings, in the compartment 3 of the automobile 1.

The memory 32 stores a program to be executed by the CPU 31, data used for the execution of the program, and data generated by the execution of the program. The memory 32 may be constituted by a volatile memory, such as a random access memory (RAM), and a non-volatile memory, such as a solid state drive (SSD) or a hard disk drive (HDD).

As a result of the CPU 31 reading and executing the program stored in the memory 32, a controller is implemented in the in-vehicle object monitoring device 21 so as to centrally control the operation of the in-vehicle object monitoring device 21.

The CPU 31, which serves as the controller of the in-vehicle object monitoring device 21, may activate the millimeter-wave sensor 41 and detect an object, such as an occupant and belongings, in the compartment 3, based on the level of the reflected millimeter waves detected by the millimeter-wave sensor 41. The CPU 31 may also monitor whether there is an object in the compartment 3 and the state of a detected object.

During monitoring, the CPU 31 may switch the frequency band of millimeter waves to be output from the millimeter-wave sensor 41 among preset millimeter frequency bands. Millimeter waves of a lower frequency band are resistant to obstacles, while those of a higher frequency band can detect the movement of the chest of an occupant. The surface of the chest of an occupant is changed in accordance with the breathing.

The CPU 31 may determine the type of object in the compartment 3 of the automobile 1 by comparing the detection level of the reflected millimeter waves with a threshold.

Figure 4:
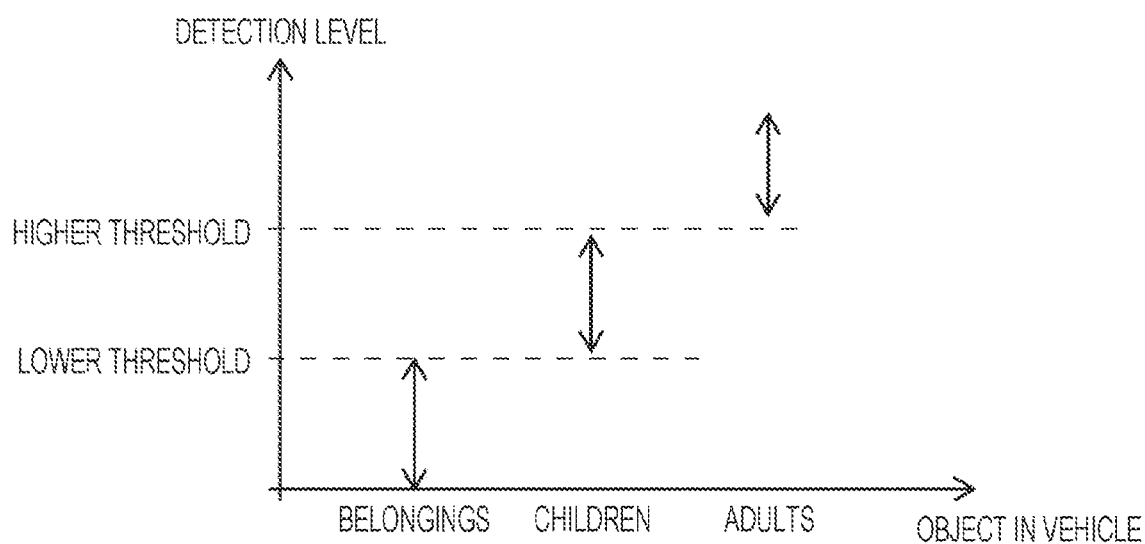
FIG. 4 is a diagram illustrating the approach to determining the type of object in a vehicle based on the detection level of a millimeter-wave sensor illustrated in FIG. 3.

FIG. 4 is a diagram illustrating the approach to determining the type of object in a vehicle based on the detection level of the millimeter-wave sensor 41 illustrated in FIG. 3.

In FIG. 4, the vertical axis indicates the level of the reflected millimeter waves detected by the millimeter-wave sensor 41, while the horizontal axis indicates the type of object in the automobile 1. In FIG. 4, three types of objects: the belongings, children including the child 13, and adults are indicated as examples of objects.

A range of the detection levels of waves reflected by the belongings, that of children, and that of adults can be separated from each other, as illustrated in FIG. 4.

The CPU 31 can thus distinguish the belongings and children from each other by using a lower threshold positioned between the detection levels of waves reflected by the belongings and those by children.

The CPU 31 can also distinguish children and adults from each other by using a higher threshold positioned between the detection levels of waves reflected by children and those by adults.

The lower threshold and the higher threshold may be fixed values or may be values variable depending on the situation, for example.

The CPU 31 is able to detect objects including occupants in the compartment 3 of the automobile 1 by using the millimeter-wave sensor 41 which may serve as an in-vehicle object detector.

The CPU 31 of the in-vehicle object monitoring device 21 illustrated in FIG. 3 may determine by using millimeter waves whether an occupant, such as the child 13, is being left in the compartment 3 of the automobile 1, and output an alert to the driver 11. To inform the driver 11 that an occupant is being left in the compartment 3, an alert may be output to the meter liquid crystal panel 53, from the horn 50, or to the mobile terminal 63 of the driver 11, for example. The CPU 31 may also output an emergency call to the server device 62 of a public service sector, for example. In one example, the CPU 31 may serve as an alert controller to control the execution of multiple alert output operations including an output operation of an alert to the mobile terminal 63 of the driver 11 if an occupant is being left in the compartment 3 after the driver 11 has left the automobile 1.

However, if the driver 11 is already far from the automobile 1, an alert output to the meter liquid crystal panel 53 or an alert output from the horn 50 does not reach the driver 11. Additionally, if the driver 11 has left his/her mobile terminal 63 in the compartment 3, an alert output to the mobile terminal 63 does not reach the driver 11. In those situations, the driver 11 is unable to deal with the occupant being left in the compartment 3, and there may be no other measures to be taken than making an emergency call to the server device 62 of a service sector, such as a public service sector. This however raises the burden on service sectors. With an increased number of emergency calls, the service sectors may not be able to suitably handle an occupant being left in a vehicle.

It is thus desirable for the CPU 31 to output an alert more suitably in accordance with the situation.

FIG. 5 illustrates an example of an emergency contact list recorded on the memory 32 of the in-vehicle object monitoring device 21 illustrated in FIG. 3.

The CPU 31 can control the execution of multiple alert output operations including output operations of an alert to the mobile terminals 63 of multiple users including at least the driver 11, based on the emergency contact list in FIG. 5.

The emergency contact list recorded on the memory 32 has a record for each alert output destination. Each record has fields: alert output order, medium, content, and obtained information. Target examples for each record are also added in FIG. 5.

The record of the first row is targeted for a first driver of the automobile 1. Regarding the alert output order, the top priority is given to the first driver. The CPU 31 performs control to send the position of the automobile 1 and detailed information about an object being left in the compartment 3 (an image of the compartment 3), for example, to the first driver by performing communication with the application program installed in the mobile terminal 63 of the first driver.

The record of the second row is targeted for a second driver of the automobile 1. Regarding the alert output order, the second top priority is given to the second driver. The CPU 31 performs control to send the position of the automobile 1 and detailed information about an object being left in the compartment 3 (an image of the compartment 3), for example, to the second driver by performing communication with the application program installed in the mobile terminal 63 of the second driver.

The record of the third row is targeted for the occupant 12 of the automobile 1. Regarding the alert output order, the third priority is given to the occupant 12. The CPU 31 performs control to send the position of the automobile 1 and detailed information about an object being left in the compartment 3 (an image of the compartment 3), for example, to the occupant 12 via email that can be viewed by the mobile terminal 63 of the occupant 12.

The record of the fifth row is targeted for a first emergency call destination (emergency call 1). The CPU 31 performs control to send the position of the automobile 1, brief information about an object being left in the compartment 3, and contact details of the above-described first driver included in the emergency contact list to the first emergency call destination by telephone.

The record of the sixth row is targeted for a second emergency call destination (emergency call 2). The CPU 31 performs control to send the position of the automobile 1, detailed information about an object being left in the compartment 3 (an image of the compartment 3 and biological information, such as the breathing and pulse rate, of the occupant being left in the compartment 3), and contact details of the above-described first driver included in the emergency contact list to the second emergency call destination by performing predetermined communication with the server device 62.

Figure 6:
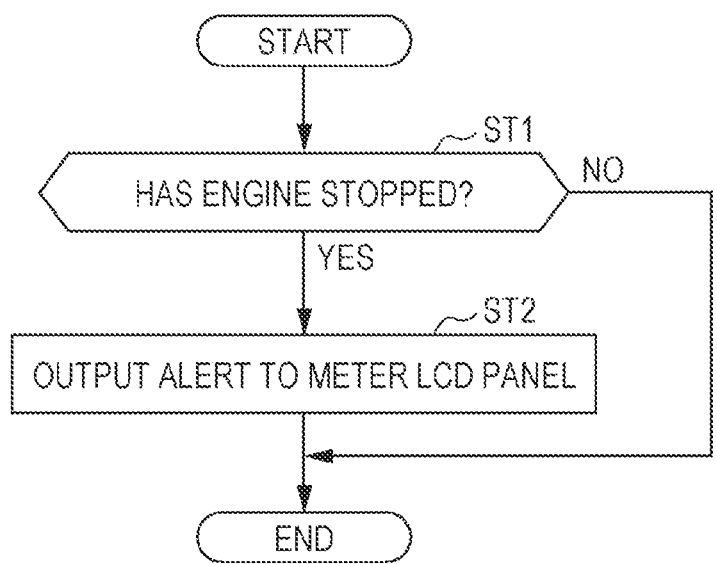
FIG. 6 is a flowchart illustrating preliminary alert output control processing executed by a central processing unit (CPU) of the in-vehicle object monitoring device illustrated in FIG. 3.

FIG. 6 is a flowchart illustrating preliminary alert output control processing executed by the CPU 31 of the in-vehicle object monitoring device 21 illustrated in FIG. 3.

In one example, the CPU 31 repeatedly executes the processing in FIG. 6 as the alert controller.

In step ST1, the CPU 31 determines whether the automobile 1 has stopped running and the engine, which is a power source for the automobile 1, has stopped. The CPU 31 may determine whether the engine has stopped according to whether the ignition switch 43 is operated to stop the engine. If the engine has stopped, the CPU 31 proceeds to step ST2. If the engine has not stopped, the CPU 31 terminates this processing.

In step ST2, the CPU 31 outputs an alert to the meter liquid crystal panel 53 provided in front of the driver 1 on the dashboard 7, regardless of whether an occupant is being left in the compartment 3. The CPU 31 outputs an alert to the output device 25 via the input/output unit 34 and the in-vehicle network 28. The output device 25 receives the alert and displays it on the meter liquid crystal panel 53. This draws the attention of the driver 11, who has stopped the engine, not to leave any occupant in the compartment 3 before the driver 11 leaves the automobile 1. The CPU 31 then completes the processing.

Figure 7:
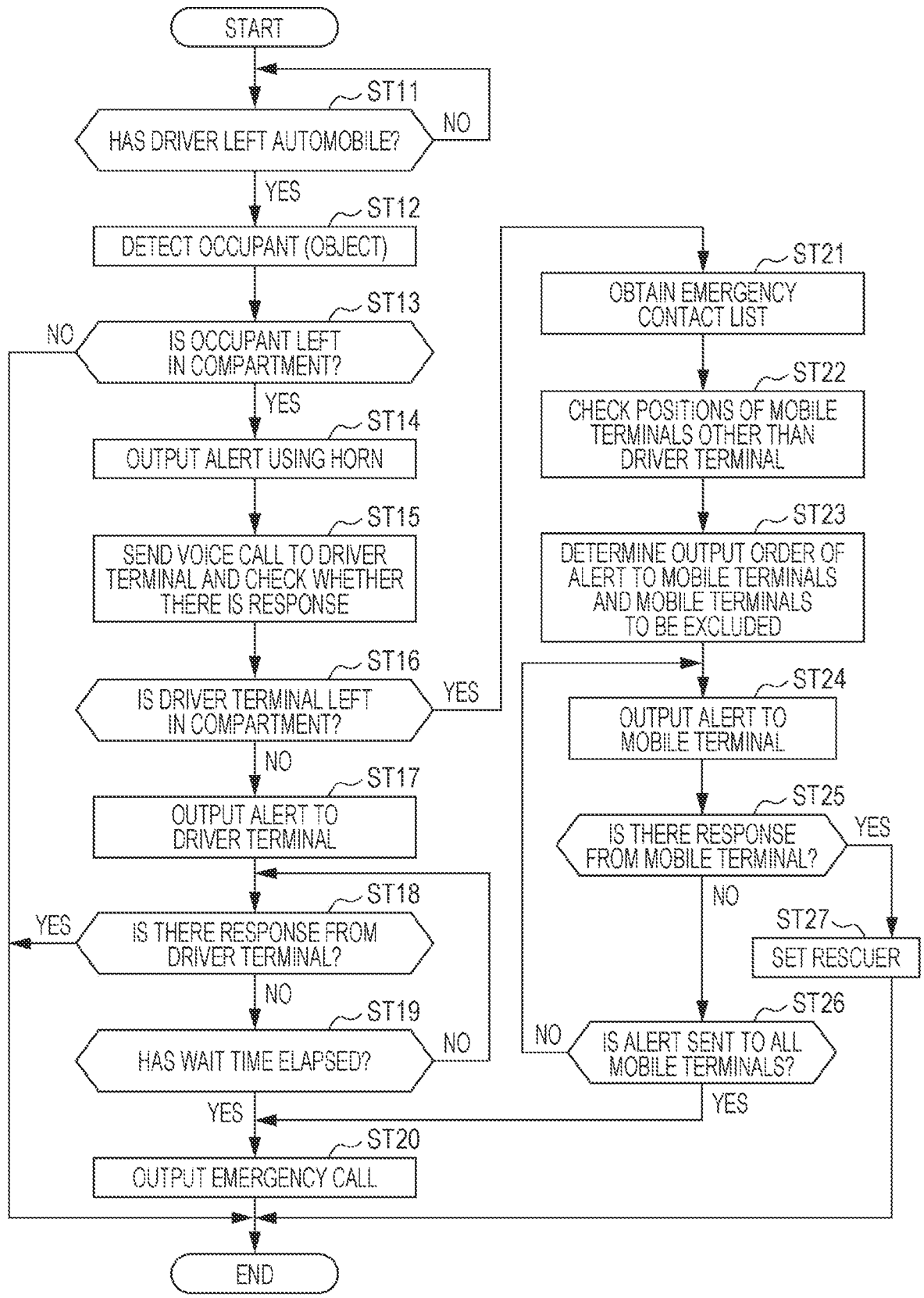
FIG. 7 is a flowchart illustrating alert output control processing executed by the CPU of the in-vehicle object monitoring device illustrated in FIG. 3.

FIG. 7 is a flowchart illustrating alert output control processing executed by the CPU 31 of the in-vehicle object monitoring device 21 illustrated in FIG. 3.

In one example, the CPU 31 repeatedly executes the processing in FIG. 7 as the alert controller.

In step ST11, the CPU 31 determines whether the driver 11 has left the automobile 1. For example, if step ST2 in FIG. 6 is executed after the ignition switch 43 is operated to stop the engine and if the door opening/closing sensor 44 has detected that the door for the driver 11 has opened and closed or the door lock sensor 45 has detected the unlocking state of the door locker, the CPU 31 may determine that the driver 11 has left the automobile 1. The CPU 31 repeats step ST11 until it determines that the driver 11 has left the automobile 1. When the driver 11 has left the automobile 1, the CPU 31 proceeds to step ST12.

In step ST12, the CPU 31 begins an execution of occupant (object) detection processing to check whether an occupant is being left in the compartment 3 after the driver 11 has left the automobile 1. The CPU 31 causes the millimeter-wave sensor 41 to begin an output of millimeter waves to the compartment 3 after the driver 11 has left the automobile 1 and to detect waves reflected by the compartment 3. The CPU 31 determines the presence or the absence of an object, such as an occupant, in the compartment 3 and the type of object, for example, by comparing the detection level of the millimeter-wave sensor 41 with the thresholds, as illustrated in FIG. 4.

In step ST13, the CPU 31 determines whether an occupant is being left in the compartment 3, based on the detection result of step ST12. If the CPU 31 determines the presence of an occupant, such as the child 13, in the compartment 3, it determines in step ST13 that an occupant is being left in the compartment 3 and proceeds to step ST14. If the CPU 31 determines that no occupant is left in the compartment 3, it terminates the processing.

In step ST14, the CPU 31 performs control to output an alert by using the horn 50 to inform the driver 11 that an occupant is being left in the compartment 3. In response to an instruction from the CPU 31, the output device 25 causes the horn 50 to output an alert sound. If the driver 11 is still near the automobile 1, he/she can hear the sound of the horn 50 and realize that an occupant is being left in the compartment 3.

In step ST15, the CPU 31 sends a voice call to a mobile terminal 80 (driver terminal) illustrated in FIG. 8, which will be discussed later, and checks whether a response is returned from the mobile terminal 80. The UI device 24 outputs voice from the speaker 48 in response to an instruction from the CPU 31. Voice output from the speaker 48 may be a predetermined calling message that can be automatically responded by an assistant application installed in the mobile terminal 80 of the driver. Voice output from the speaker 48 may be voice synthesized in the UI device 24 or the recorded voice of the driver 11. In this manner, the CPU 31 sends a voice call to the mobile terminal 80 of the driver having left the automobile 1. If the mobile terminal 80 is left in the compartment 3, it outputs a response sound to the voice call. After outputting the voice call from the speaker 48, the UI device 24 monitors input of sound into the microphone 49 so as to detect a response sound from the mobile terminal 80 of the driver. The UI device 24 outputs a detection result indicating whether a response sound is returned from the mobile terminal 80 to the CPU 31.

In step ST16, the CPU 31 determines whether the mobile terminal 80 of the driver is left in the compartment 3. If no sound is detected in response to the voice call to the mobile terminal 80 sent in step ST15, the CPU 31 determines that the mobile terminal 80 is not left in the compartment 3 and proceeds to step ST17. If a sound is detected in response to the voice call to the mobile terminal 80 sent in step ST15, the CPU 31 determines that the mobile terminal 80 is left in the compartment 3 and proceeds to step ST21. In this manner, if an occupant is left in the compartment 3 after the driver 11 has left the automobile 1, the CPU 31 can determine whether the mobile terminal 80 of the driver is left in the compartment 3.

The CPU 31 starts alert output processing in step ST17, which is executed when the mobile terminal 80 of the driver 11 is not left in the compartment 3. In this case, it is highly likely that the driver 11 has brought the mobile terminal 63 when leaving the automobile 1. The CPU 31 thus reads the record for the driver 11 from the emergency contact list recorded on the memory 32 and outputs an alert to the mobile terminal 80 of the driver. In response to an instruction from the CPU 31, the external communication device 27 sends an alert to the mobile terminal 80 of the driver via the base station 61. The mobile terminal 80 receives the alert and returns a response if the driver 11 has performed a certain operation in response to the alert. The external communication device 27 outputs information indicating whether a response is returned from the mobile terminal 80 of the driver to the CPU 31.

In step ST18, the CPU 31 determines whether a response is returned from the mobile terminal 80. If no response is returned from the mobile terminal 80, the CPU 31 proceeds to step ST19. If a response is returned from the mobile terminal 80, the CPU 31 terminates the processing.

In step ST19, the CPU 31 determines whether a predetermined wait time has elapsed from when an alert is output to the mobile terminal 80 of the driver. The timer 33 counts the elapsed time after the alert is output to the mobile terminal 80, and if the predetermined wait time has elapsed, the timer 33 outputs interrupt to the CPU 31. Without interrupt from the timer 33, that is, if the predetermined wait time has not elapsed, the CPU 31 returns to step ST18. This enables the CPU 31 to continue waiting for a response from the mobile terminal 80 for the predetermined wait time. After the lapse of the predetermined wait time, the CPU 31 proceeds to step ST20.

Since there is no response from the driver 11, in step ST20, the CPU 31 reads the record for an emergency contact from the emergency contact list recorded on the memory 32 and outputs an emergency call to the server device 62 as an emergency measure. In one example, the CPU 31 may serve as the alert controller and performs control to output an emergency call as an alert if there is no response to the alert output to the mobile terminal 80 of the driver having left the automobile during the predetermined wait time. In response to an instruction from the CPU 31, the external communication device 27 outputs an emergency call to the server device 62, for example, via the base station 61. Upon receiving the emergency call from the external communication device 27 by the server device 62, a public service sector, for example, using the server device 62 dispatches the staff to rescue the occupant. The CPU 31 then completes the processing.

The CPU 31 starts alert output processing in step ST21, which is executed when the mobile terminal 80 of the driver is left in the compartment 3. The CPU 31 obtains the emergency contact list illustrated in FIG. 5 by reading it from the memory 32.

In step ST22, the CPU 31 checks the positions of multiple mobile terminals 90, which are other than the mobile terminal 80 of the driver, included in the emergency contact list. The positions of the mobile terminals 90 indicated in the emergency contact list may be updated to the latest position information sent from the mobile terminals 90. For a mobile terminal 90 whose position information is not sufficient or a mobile terminal 90 from which position information is not received for a certain period of time, the CPU 31 may execute processing for obtaining the latest position information from such mobile terminals 90 according to the necessity.

In step ST23, based on the position information of the mobile terminals 63 included in the emergency contact list, the CPU 31 determines the order of mobile terminals 63 to which an alert is to be output and a mobile terminal 63 to be excluded from outputting of an alert. For example, the CPU 31 may output an alert to the mobile terminals 63 in ascending order of the distance between the position of a mobile terminal 63 and the position of the automobile 1 detected by the GNSS receiver 46. If there is a mobile terminal 63 which is separated from the automobile 1 at a certain distance or greater or a mobile terminal 63 from which position information is not obtained, the CPU 31 may exclude such mobile terminals 63.

In step ST24, the CPU 31 outputs an alert to a mobile terminal 90 other than the mobile terminal 80 included in the emergency contact list in the output order determined in step ST23. In response to an instruction from the CPU 31, the external communication device 27 sends an alert to a mobile terminal 90 other than the mobile terminal 80 via the base station 61. The user of the mobile terminal 90 receives an alert via the mobile terminal 90 and performs a certain operation in response to the alert. The external communication device 27 outputs information indicating whether a response is returned from the mobile terminal 90 to the CPU 31.

In step ST25, the CPU 31 determines whether a response is returned from the mobile terminal 90 having received the alert. As in step ST19, the CPU 31 may wait for a response from the mobile terminal 90 for a predetermined time. If no response is received from the mobile terminal 90, the CPU 31 proceeds to step ST26. If a response is received from the mobile terminal 90, the CPU 31 proceeds to step ST27.

In step ST26, the CPU 31 determines whether an alert is sent to all the mobile terminals 90 included in the emergency contact list or to the mobile terminals 90 except for the excluded mobile terminals 90. If there is a mobile terminal 90 to which an alert is not yet sent, the CPU 31 returns to step ST24. The CPU 31 repeats steps ST24 through ST26 until an alert is output to all the mobile terminals 90 except for the excluded mobile terminals 90. When an alert is sent to all the mobile terminals 90, the CPU 31 proceeds to step ST20. In this manner, in one example, the CPU 31 may serve as the alert controller, and if the mobile terminal 80 of the driver is left in the compartment 3, the CPU 31 performs control to output an alert to a mobile terminal 90 other than the mobile terminal 80. In one example, the CPU 31 may serve as the alert controller, and if there is no response for the predetermined wait time to the alert output to a mobile terminal 90 illustrated in FIG. 9, which will be discussed later, the CPU 31 performs control to output an emergency call as an alert.

In step ST27, the CPU 31 sets a person rescuing the occupant being left in the automobile 1 (hereinafter called the rescuer). The CPU 31 changes the rescuer from the driver 11 set in the memory 32 when the automobile 1 has started into the user of the mobile terminal 90 which has responded. The CPU 31 then terminates the processing. In one example, the CPU 31 may serve as the alert controller, and if there is a response to an alert output to a mobile terminal 90 other than the mobile terminal 80 of the driver, the CPU 31 terminates the processing in FIG. 7 without outputting an emergency call as an alert.

As described above, in one example, the CPU 31 of the in-vehicle object monitoring device 21 may serve as the alert controller, and in accordance with whether the mobile terminal 80 of the driver having left the automobile is left in the compartment 3, the CPU 31 switches the alert output destination among the mobile terminals 63 of multiple users including the mobile terminal 80 of the driver and also selects whether to output an emergency call as an alert. For example, when the mobile terminal 80 of the driver is not left in the compartment 3, the CPU 31 outputs an alert only to the mobile terminal 80 of the driver among the mobile terminals 63 of multiple users. When the mobile terminal 80 of the driver is left in the compartment 3, the CPU 31 sequentially outputs an alert to mobile terminals 90 other than the mobile terminal 80 among the mobile terminals 63 of multiple users. In this manner, when the mobile terminal 80 of the driver is left in the compartment 3, an alert is not unnecessarily output to the driver 11 who is unlikely to respond, and instead, an alert is output to the users of the mobile terminals 90 other than the mobile terminal 80 of the driver. This can decrease the number of times that the CPU 31 outputs an emergency call and accordingly reduce the burden imposed on the emergency contacts.

In the above-described processing, the CPU 31 outputs an alert using the meter liquid crystal panel 53 and that using the horn 50 of the automobile 1, regardless of whether the mobile terminal 80 is left in the compartment 3. However, the CPU 31 may select whether to output an alert using the meter liquid crystal panel 53 and that using the horn 50 in accordance with whether the mobile terminal 80 is left in the compartment 3. Additionally, in accordance with whether the mobile terminal 80 is left in the compartment 3, the CPU 31 may change the output order of an alert to mobile terminals and whether an alert is sent to the mobile terminals.

Figure 8:
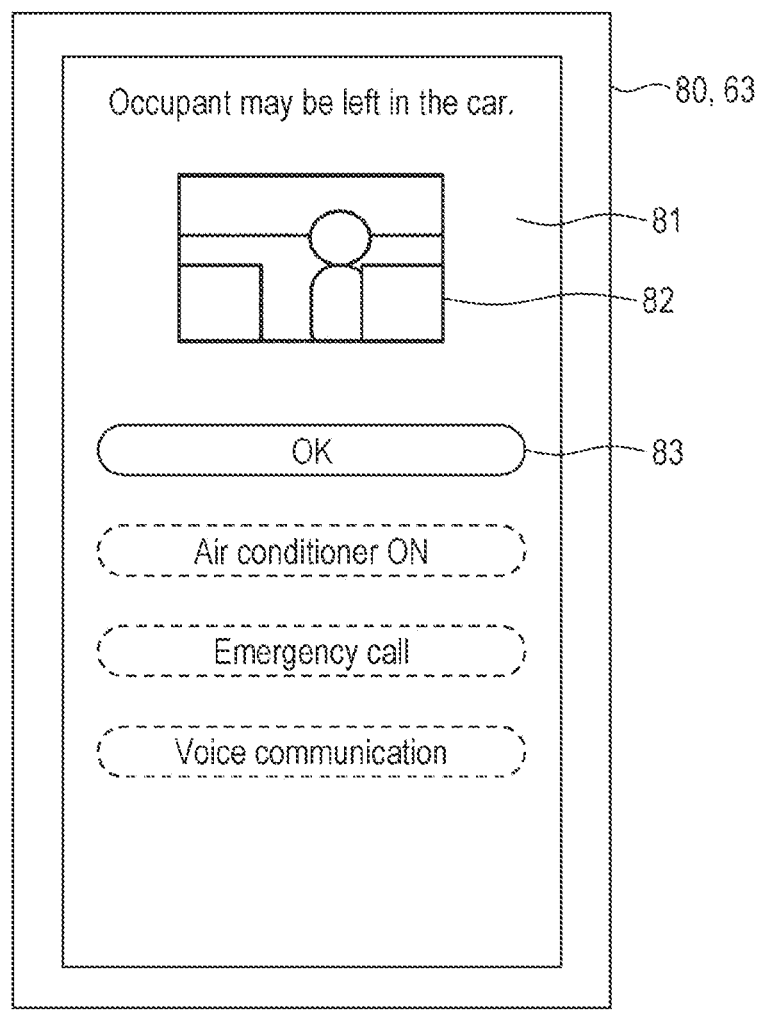
FIG. 8 illustrates an example of an alert screen displayed on a mobile terminal of a driver according to the alert output control processing in FIG. 7.

FIG. 8 illustrates an example of an alert screen 81 displayed on the mobile terminal 80 of the driver according to the alert output control processing in FIG. 7.

The CPU 31 of the in-vehicle object monitoring device 21 sends the alert screen 81 illustrated in FIG. 8 to the mobile terminal 80 of the driver in step ST17 in FIG. 7.

On the alert screen 81 in FIG. 8, an image 82 of the compartment 3 captured by the in-vehicle camera 42 after the driver 11 has left the automobile 1 and an OK button 83 are displayed. The OK button 83 is operated when the driver 11 has checked and understood the situation where the occupant is left in the compartment 3.

When the driver 11 has operated the OK button 83, the mobile terminal 80 returns a response indicating that the driver has checked and understood the situation to the in-vehicle object monitoring device 21 via the base station 61 and the external communication device 27. The CPU 31 of the in-vehicle object monitoring device 21 may use this response to determine in step ST18 whether a response is received from the mobile terminal 80.

Figure 9:
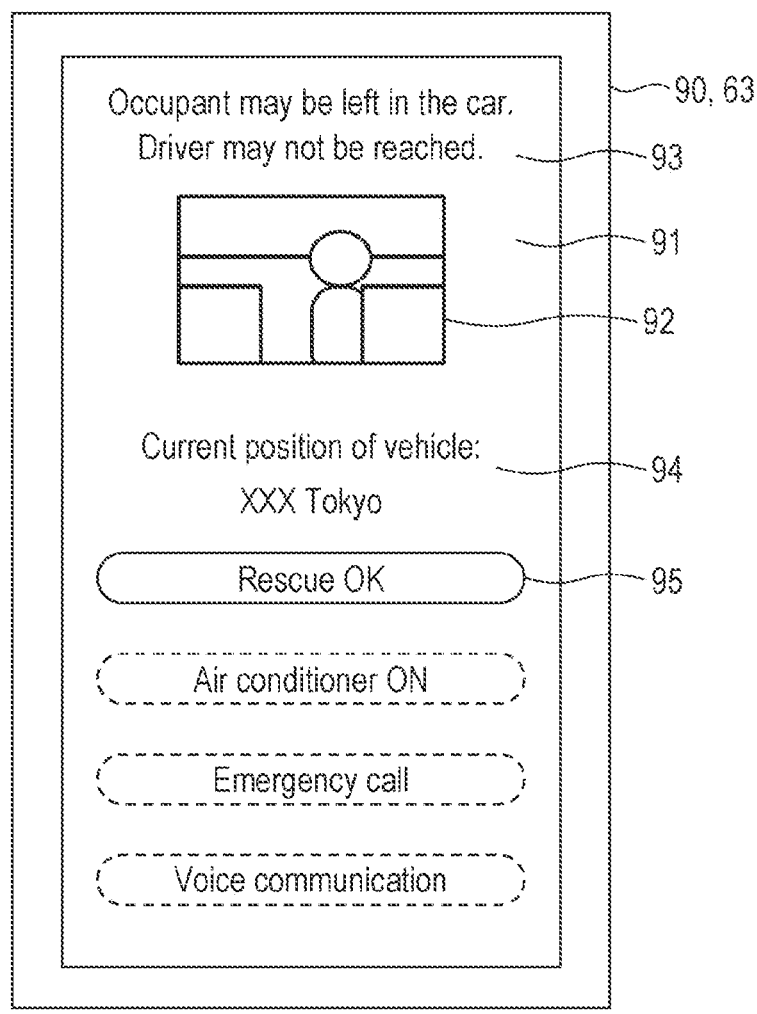
FIG. 9 illustrates an example of an alert screen displayed on a mobile terminal of a user other than the driver according to the alert output control processing in FIG. 7.

FIG. 9 illustrates an example of an alert screen 91 displayed on a mobile terminal 90 of a user other than the driver according to the alert output control processing in FIG. 7.

The CPU 31 of the in-vehicle object monitoring device 21 sends the alert screen 91 illustrated in FIG. 9 to the mobile terminal 90 of a user other than the driver in step ST24 in FIG. 7.

On the alert screen 91 in FIG. 9, an image 92 of the compartment 3 captured by the in-vehicle camera 42 after the driver 11 has left the automobile 1 and a rescue OK button 95 are displayed. The rescue OK button 95 is operated when the user of the mobile terminal 90 has understood that the occupant being left in the compartment 3 is to be rescued.

On the alert screen 91 in FIG. 9, a message 93 and a current position 94 of the automobile 1 are also displayed. The message 93 indicates that it may not be possible to reach the mobile terminal 80 of the driver.

When the user of the mobile terminal 90 has operated the rescue OK button 95, the mobile terminal 90 returns a response indicating that the user of the mobile terminal 90 has checked and understood the situation where the occupant being left in the compartment 3 is to be rescued to the in-vehicle object monitoring device 21 via the base station 61 and the external communication device 27. The CPU 31 of the in-vehicle object monitoring device 21 may use this response to determine in step ST25 whether a response is returned from the mobile terminal 90.

Figure 10:
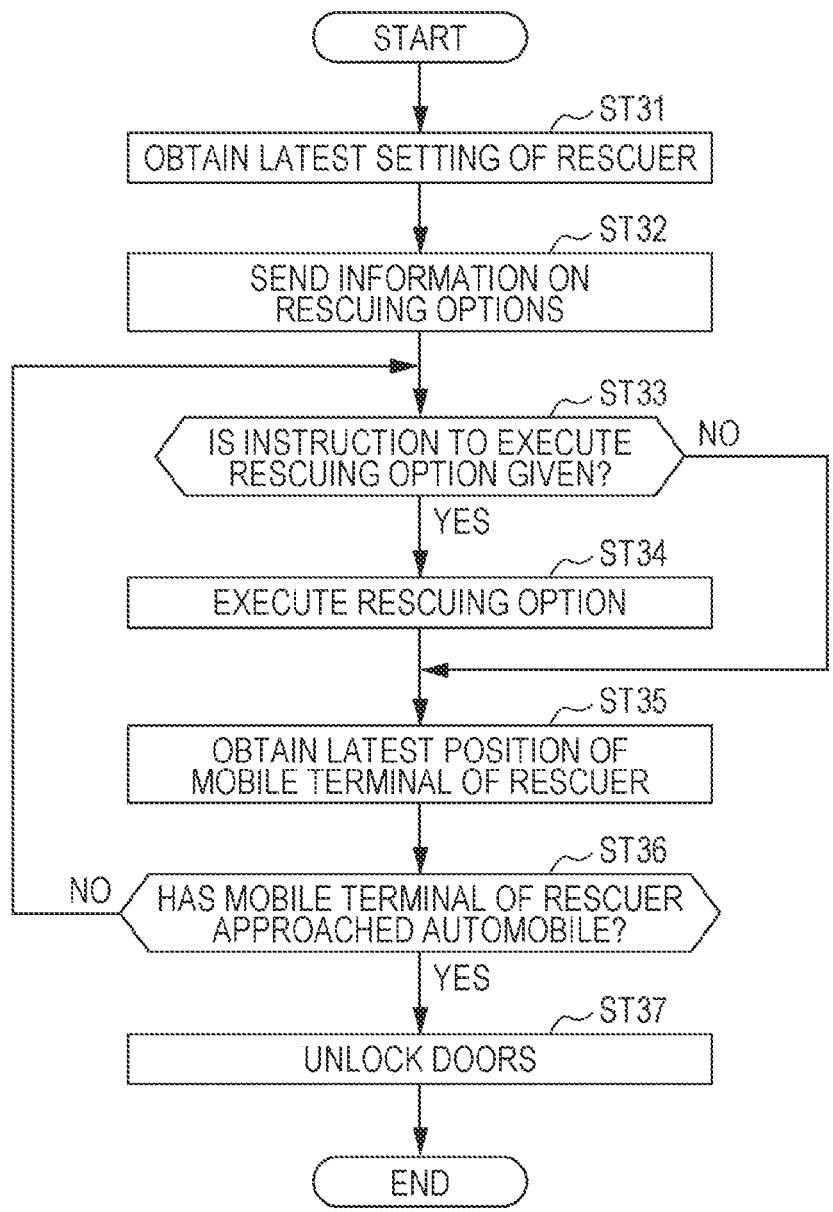
FIG. 10 is a flowchart illustrating rescue control processing executed by the CPU of the in-vehicle object monitoring device illustrated in FIG. 3.

FIG. 10 is a flowchart illustrating rescue control processing executed by the CPU 31 of the in-vehicle object monitoring device 21 illustrated in FIG. 3.

In one example, the CPU 31 repeatedly executes the processing in FIG. 10 as the alert controller.

The CPU 31 may execute the processing in FIG. 10 immediately after the alert output control processing in FIG. 7, for example.

In step ST31, the CPU 31 of the in-vehicle object monitoring device 21 obtains the latest setting of the rescuer from the memory 32. Basically, the rescuer is the driver 11, but if the mobile terminal 80 of the driver is left in the compartment 3, a person other than the driver included in the emergency contact list is set as the rescuer.

In step ST32, as a continuation from outputting of an alert in step ST24 in FIG. 7, the CPU 31 sends information on feasible multiple rescuing options to the mobile terminal 63 of the user set as the rescuer in the memory 32. In response to an instruction from the CPU 31, the external communication device 27 sends information on the feasible multiple rescuing options to the mobile terminal 63 of the rescuer via the base station 61. The rescuer selects one of the multiple rescuing options, and the mobile terminal 63 of the rescuer outputs the selected rescuing option to the CPU 31 via the external communication device 27.

In step ST33, the CPU 31 determines whether an instruction to execute a rescuing option has been given from the mobile terminal 63 of the rescuer. If the CPU 31 has received a selected rescuing option from the mobile terminal 63 of the rescuer, it determines that an instruction to perform a rescuing option has been given and proceeds to step ST34. If the CPU 31 has not received a selected rescuing option, it determines that such an instruction has not been given and proceeds to step ST35.

In step ST34, the CPU 31 executes the rescuing option specified by the mobile terminal 63 of the rescuer. If the CPU 31 has received a selected rescuing option from the mobile terminal 63, the CPU 31 executes this rescuing option.

In step ST35, the CPU 31 obtains the latest position information from the mobile terminal 63 of the rescuer. For example, if a response is received from a mobile terminal 90 of a user other than the driver, the CPU 31 obtains the latest position information from the mobile terminal 90.

In step ST36, the CPU 31 compares the position of the mobile terminal 63 of the rescuer with the position of the automobile 1. The CPU 31 then determines whether the mobile terminal 63 of the rescuer has approached the automobile 1 close enough to open and close the doors of the automobile 1. If the mobile terminal 63 of the rescuer has not approached the automobile 1, the CPU 31 returns to step ST33 and repeats steps ST33 through ST36. That is, the CPU 31 waits until the mobile terminal 63 approaches the automobile 1 while waiting for an instruction to execute a rescuing option from the rescuer. When the mobile terminal 63 of the rescuer has approached the automobile 1, the CPU 31 proceeds to step ST37.

In step ST37, the CPU 31 unlocks the doors. For example, when the position of the mobile terminal 63 of the rescuer obtained from the mobile terminal 63 is found to be close to the position of the automobile 1, the CPU 31 unlocks the doors. This enables the rescuer to enter the compartment 3 of the automobile 1 and rescue an occupant, such as the child 13, being left in the compartment 3 even if the rescuer does not have a key device for unlocking the doors of the automobile 1.

In this manner, in one example, the CPU 31 may serve as the alert controller, and upon receiving a response to an alert output to a mobile terminal 90 of a user other than the driver, the CPU 31 can communicate with this mobile terminal 90 and execute rescue control processing for the occupant being left in the compartment 3.

Figure 11:
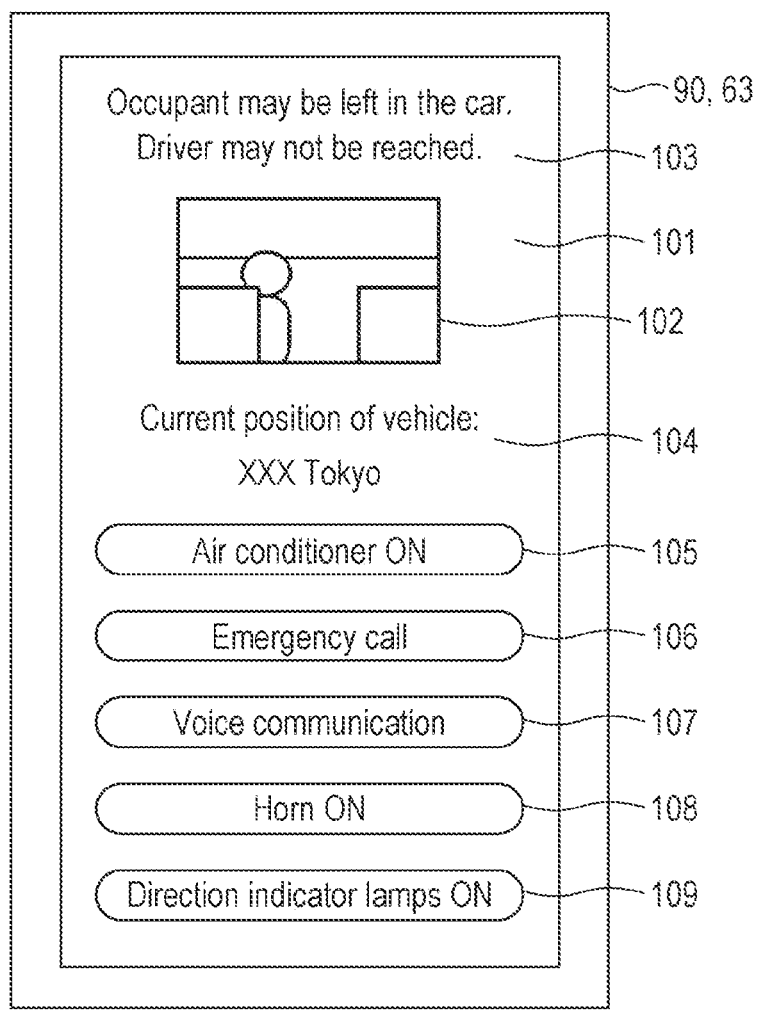
FIG. 11 illustrates an example of a rescue screen displayed on a mobile terminal of a user other than the driver according to the rescue control processing in FIG. 10.

FIG. 11 illustrates an example of a rescue screen 101 displayed on a mobile terminal 90 of a user other than the driver according to the rescue control processing in FIG. 10.

The CPU 31 of the in-vehicle object monitoring device 21 sends the rescue screen 101 illustrated in FIG. 11 to the mobile terminal 63 of the rescuer in step ST32 in FIG. 10.

On the rescue screen 101 in FIG. 11, an image 102 of the compartment 3, which is most recently captured by the in-vehicle camera 42 after the driver 11 has left the automobile 1, and multiple operation buttons 105 through 109 indicating feasible multiple rescuing options are displayed. In the example in FIG. 11, the following multiple operation buttons 105 through 109 are displayed: an operation button 105 for turning ON the air-conditioning device 26, an operation button 106 for sending an emergency call, an operation button 107 for performing voice communication to couple to the UI device 24 of the automobile 1 and to talk with an occupant being left in the compartment 3, an operation button 108 for beeping the horn 50 to report the occurrence of an emergency state to people around the automobile 1, and an operation button 109 for causing the direction indicator lamps 51 to blink.

The multiple operation buttons 105 through 109 may also be displayed on an alert screen, as indicated by the broken lines on the alert screen 81 in FIG. 8 and the alert screen 91 in FIG. 9.

On the rescue screen 101 in FIG. 11, a message 103 and a current position 104 of the automobile 1 are also displayed. The message 103 indicates that it may not be possible to reach the mobile terminal 80 of the driver. In this manner, in one example, the CPU 31 may serve as the alert controller and sends information on the position of the automobile 1, the image 102 of the compartment 3 of the automobile 1, the message 103 indicating that it may not be possible to reach the mobile terminal 80 of the driver, and the multiple operation buttons 105 through 109 for executing multiple rescuing options to the mobile terminal 63 having responded.

This enables the rescuer to move to the position of the automobile 1 displayed on the rescue screen 101 in FIG. 11 and to rescue the occupant being left in the automobile 1.

If the state of the occupant being left in the automobile 1 is changed before the rescuer reaches the automobile 1, the rescuer can operate the operation buttons 105 through 109 to start the air-conditioning device 26, to talk to the occupant, to beep the horn 50, to cause the direction indicator lamps 51 to blink, or to send an emergency call, for example.

As described above, in the embodiment, when the driver 11 has left the automobile 1, the CPU 31 of the in-vehicle object monitoring device 21 causes the millimeter-wave sensor 41 to detect an occupant being left in the compartment 3. If an occupant is left in the compartment 3, the CPU 31 determines whether the mobile terminal 80 of the driver is left in the compartment 3. The CPU 31 then switches the outputting of an alert to among the mobile terminals 63 of multiple persons including the mobile terminal 80 of the driver in accordance with whether the mobile terminal 80 of the driver is left in the compartment 3.

In this manner, in the embodiment, the CPU 31 switches the alert output operation among the mobile terminals 63 of multiple persons including the mobile terminal 80 of the driver having left the automobile. Even if the driver 11 has left his/her mobile terminal 63 in the compartment 3, the CPU 31 can identify this situation and suitably output an alert to the mobile terminal 90 of a person other than the driver so as to inform this person that an occupant is being left in the automobile.

While the embodiment has been described above, the disclosure is not restricted thereto. Various modifications and/or changes may be made without departing from the spirit and scope of the disclosure.

In the above-described embodiment, the in-vehicle object monitoring device 21 detects an object, such as an occupant, based on the detection result of the millimeter-wave sensor 41. The in-vehicle object monitoring device 21 may also use an image captured by the in-vehicle camera 42 to detect an object, such as an occupant.

In the above-described embodiment, based on the detection result of an occupant being left in the compartment 3 after the driver 11 has left the automobile 1, the CPU 31 of the in-vehicle object monitoring device 21 performs control to switch between the above-described multiple alert output operations and to determine whether to inform a rescuer of multiple rescuing options and whether to execute a selected rescuing option.

Alternatively, one of the CPUs of the DMS 22, the sensor device 23, the UI device 24, the output device 25, the air-conditioning device 26, and the external communication device 27 disposed in the control system 20 or multiple CPUs including the CPU 31 of the in-vehicle object monitoring device 21 may perform control of the above-described switching and determining operations.

To reduce the processing load on the control system 20 of the automobile 1, the CPU of the base stations 61 and/or that of the server 62 may execute part of the above-described switching and determining operations.

In the above-described embodiment, in one example, the CPU 31 may serve as the alert controller and can check the positions of the mobile terminals of multiple persons other than the driver having left the automobile 1 and sequentially output an alert in ascending order of the distance between the position of a mobile terminal of a person other than the driver and the position of the automobile 1. Then, if there is a response to the alert to the mobile terminal of a person other than the driver, the alert controller can communicate with this mobile terminal and execute rescue control processing for the occupant being left in the compartment 3. The alert controller can also send a mobile terminal having responded at least one item of information among the position of the automobile 1, a captured image of the compartment of the automobile 1, a message indicating that it may not be possible to reach the mobile terminal of the driver having left the automobile 1, and multiple rescuing options. If an instruction to execute processing of a selected rescuing option is returned from the mobile terminal of a person other than the driver, the alert controller can execute the selected rescuing option in rescue control processing.

In one example, the millimeter-wave sensor 41 may serve as the in-vehicle object detector and can detect an object including an occupant in the compartment of the automobile 1. As the millimeter-wave sensor 41, a millimeter-wave sensor that outputs millimeter radio waves to the compartment of the automobile 1 and that detects millimeter waves reflected by objects, such as an occupant and belongings, in the compartment of the automobile 1 may be used.

The control system 20 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the in-vehicle object monitoring device 21, the DMS 22, the sensor device 23, the UI device 24, the output device 25, the air-conditioning device 26, the external communication device 27. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. An alert system for a vehicle, the alert system comprising:
    an in-vehicle object detector configured to detect objects in a compartment of the vehicle, the objects including an occupant; and
    an alert controller is configured to:
        in response to determining that a driver of the vehicle has left the vehicle, cause the in-vehicle object detector to detect that the occupant is being left in the compartment of the vehicle;
        in response to determining that the occupant is being left in the compartment after the driver has left the vehicle, determine whether the mobile terminal of the driver is left in the compartment;
        in response to determining that the mobile terminal of the driver is left in the compartment, output an alert to one of mobile terminals that belong to persons other than the driver, and
        in response to determining that a response to the alert is received from the one of the mobile terminals, communicate with the one of the mobile terminals and execute rescue control processing for the occupant who is being left in the compartment after the driver has left the vehicle,
    wherein the execute rescue control processing comprising:
        sending information on feasible multiple rescuing options to one of the mobile terminals;
        determining whether an instruction to execute a rescuing option is received from one of the mobile terminals; and
        executing the rescuing option specified by one of the mobile terminals.

2. The alert system according to claim 1, wherein the alert controller is configured to:
    send a voice call to the mobile terminal of the driver having left the vehicle; and
    in a case where there is a response to the voice call, determine that the mobile terminal of the driver is left in the compartment.

3. The alert system according to claim 1, wherein the alert controller is configured to:
    obtain a position of the one of the mobile terminals having responded;
    compare the obtained position of the one of the mobile terminals with a position of the vehicle; and
    unlock a door of the vehicle in a case where the obtained position of the one of the mobile terminals has approached the position of the vehicle.

4. An alert system for a vehicle, the alert system comprising:
    a sensor configured to detect objects in a compartment of the vehicle, the objects including the occupant; and
    circuitry configured to:
        in response to determining that a driver of the vehicle has left the vehicle, cause the sensor to detect that the occupant is being left in the compartment of the vehicle;
        in response to determining that the occupant is being left in the compartment after the driver has left the vehicle, determine whether the mobile terminal of the driver is left in the compartment;
        in response to determining that the mobile terminal of the driver is left in the compartment, output an alert to one of mobile terminals that belong to persons other than the driver, and
        in response to determining that a response to the alert is received from the one of the mobile terminals, communicate with the one of the mobile terminals and execute rescue control processing for the occupant who is being left in the compartment after the driver has left the vehicle, wherein the execute rescue control processing comprising:
  sending information on feasible multiple rescuing options to one of the mobile terminals;
  determining whether an instruction to execute a rescuing option is received from one of the mobile terminals; and
  executing the rescuing option specified by one of the mobile terminals.

* * * * *